A. TAPLIN.
PLANT SPRAY.
APPLICATION FILED SEPT. 1, 1909.

952,152.

Patented Mar. 15, 1910.

2 SHEETS—SHEET 1.

Witnesses.
S. H. Clarke.
H. Wasserman.

Inventor.
Alvin Taplin.
By Louis M. Schmidt
Atty.

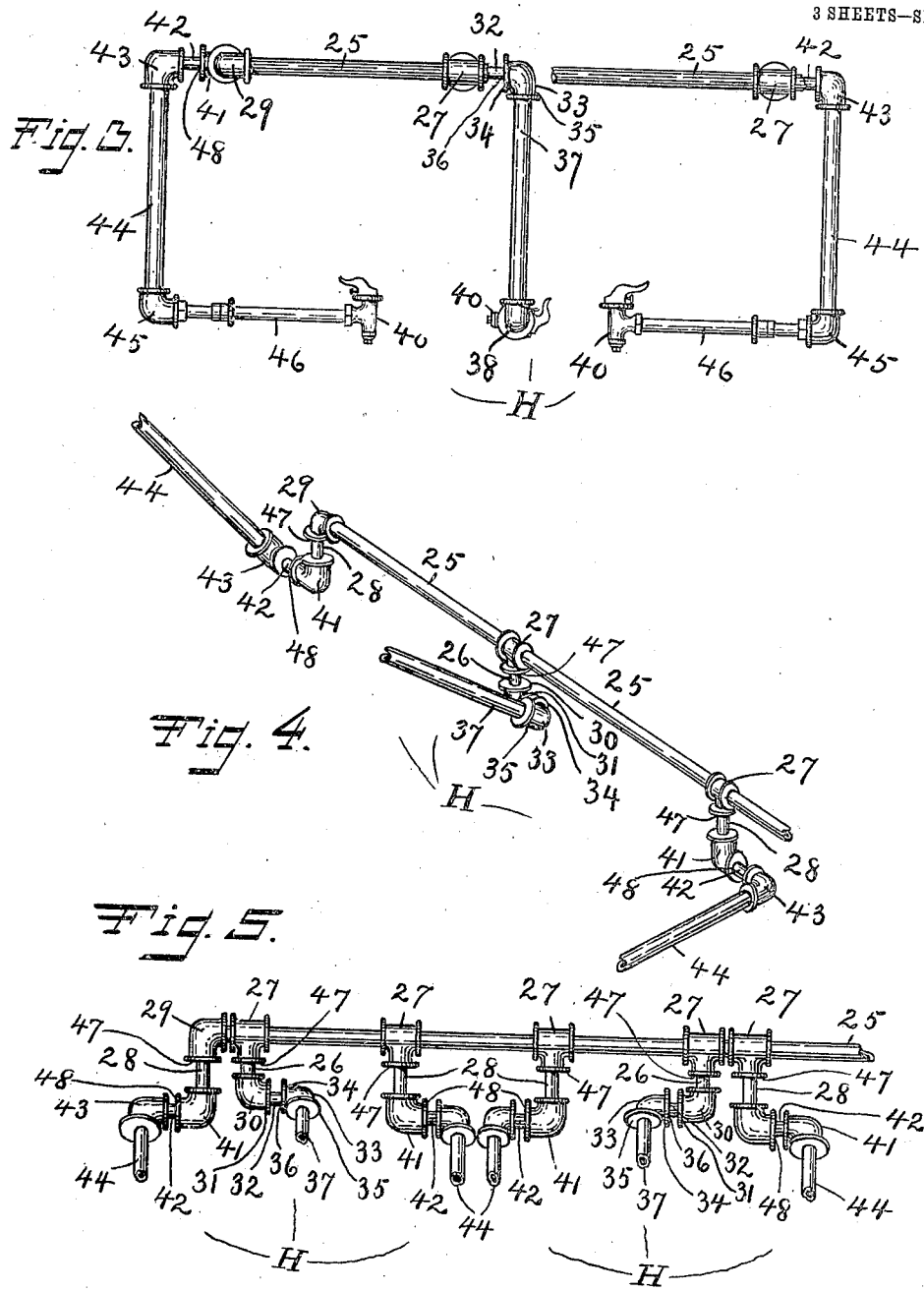

A. TAPLIN.
PLANT SPRAY.
APPLICATION FILED SEPT. 1, 1909.

952,152.

Patented Mar. 15, 1910.
3 SHEETS—SHEET 3.

Witnesses.
S. H. Clarke
N. L. Lockwood

Inventor.
Alvin Taplin.
By Louis M. Schmidt
Atty.

UNITED STATES PATENT OFFICE.

ALVIN TAPLIN, OF FORESTVILLE, CONNECTICUT.

PLANT-SPRAY.

952,152.
Specification of Letters Patent.
Patented Mar. 15, 1910.

Application filed September 1, 1909. Serial No. 515,734.

*To all whom it may concern:*

Be it known that I, ALVIN TAPLIN, a citizen of the United States, residing at Forestville, in the county of Hartford and State of Connecticut, have invented certain new and useful Improvements in Plant-Sprays, of which the following is a specification.

My invention relates to improvements in plant sprays and the objects of my improvements are simplicity and economy in construction and convenience and efficiency in use.

Figure 1:
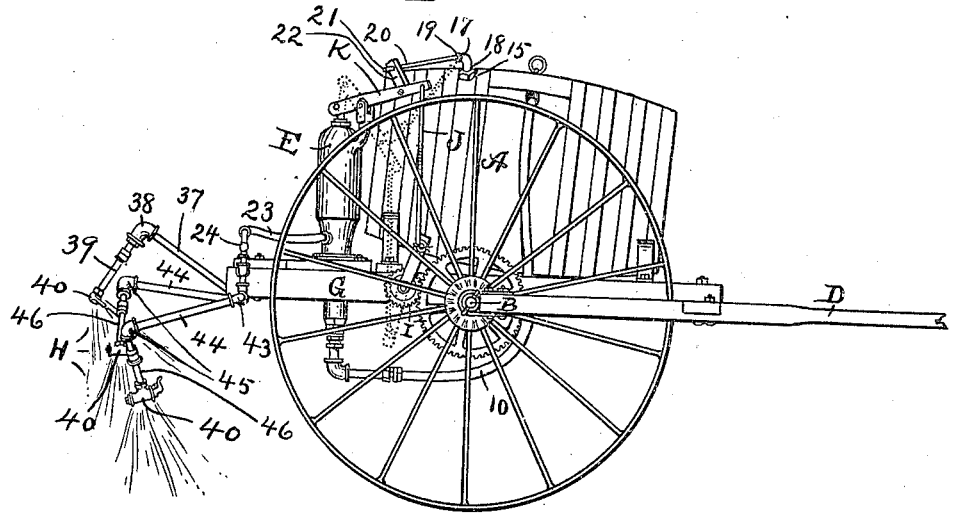
Figure 2:
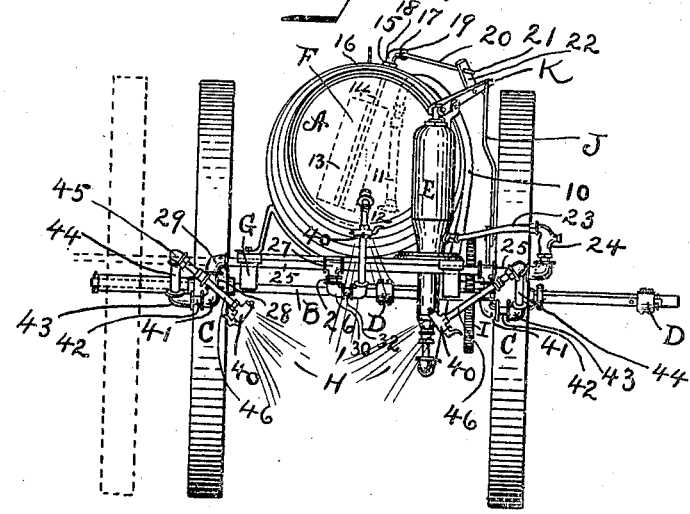
Figure 6:
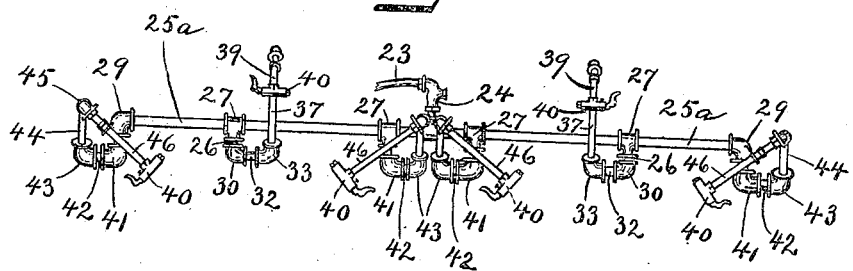

In the accompanying drawings—Figure 1 is a side elevation of my plant spray. Fig. 2 is a rear elevation of the same. Fig. 3 is a plan view of a delivery set, on an enlarged scale. Fig. 4 is a perspective view of the same, in part broken out. Fig. 5 is a rear elevation of a modified arrangement of delivery sets. Fig. 6 is a rear elevation of a modified arrangement of delivery units.

A is a supply tank or reservoir for containing the supply of plant spraying compound or solution and is mounted on an axle or shaft B by means of a platform G, in any ordinary manner, preferably on its side as shown, which shaft is rigidly and longitudinally adjustably secured to a pair of wheels C, so that as the wheels are propelled, whether by a horse hitched within the shafts D, the inner ends of which are pivotally secured to the said axle B, or by other means, the said wheels C constitute driving wheels for the said axle B so that the said axle B may be utilized as a driving shaft. By so utilizing the said axle the operating features of my device may be propelled, the same comprising a pump E and an agitator F. The said pump E may be of ordinary design, is mounted on the platform G and is adapted to draw spraying material in liquid form from the said reservoir A by means of a suction hose 10, let through an opening in the top of the reservoir A and provided preferably with an inlet pipe 11 at the lower end having a suitably flaring inlet 12 at the external free end, and deliver the same through discharge hose 23 to a suitable delivery or discharge system comprising one or more sets of spray units H to be hereafter described. Operative connection between the said pump E and the driving shaft B is obtained by means of a train of gears I taking the power from the shaft and by means of a link J delivering the same to the pump handle or lever K in the form of a suitable reciprocating motion. The said agitator F comprises a paddle 13 mounted on an arm 14 which arm passes through and is a loose fit for a collar 15 in the top wall 16 of the said reservoir A and is secured by its upper end to an elbow 17, which elbow may be a pipe fitting, the lower end 18 of which is adapted to rest on the said collar 15 and to serve as a pivotal support for the said paddle F. To the laterally extending end 19 of the said elbow 17 is secured a propelling arm 20, the outer end 21 of which is passed through and is a loose fit for a hole in a block or connecting piece 22 rigidly secured to the said pump arm K, so that the said pump arm may serve as a driving arm for the said agitator F when the pump is in operation. The said spray units H comprise a receiving pipe 25 connected as shown in Fig. 2 at the right end to a cock or valve 24 which controls the supply from the pump E and a set of three nozzles 40 connected to the said pipe 25 by three branch delivery pipes respectively, a middle branch pipe 26, connected by means of a T 27 located a little to the left of the center and two end branch delivery pipes 28, respectively a left branch connected by means of an elbow 29 and located at the left end of pipe 25 and a right branch connected by means of a T 27 located intermediate the length of the pipe 25 and near the right end of the same. The said middle branch pipe 26 is vertical and is provided at the lower end with an elbow 30. The lower arm 31 of the elbow 30 is directed toward the center and is provided with a short pipe nipple 32. The connection between the upper end of the branch pipe 26 and the T 27 consists of a pipe thread connection screwed together with sufficient pressure to be water tight and self sustaining and at the same time so as to yield sufficiently to permit of angular adjustment and comprising a self sustaining, adjustable, and flexible joint 47, and accordingly permitting of adjustment of the nozzles 40 supported by the same in a horizontal plane. The nipple 32 at the end remote from the elbow 30 is similarly provided with a pipe thread adapted to be received into a correspondingly threaded arm 34 of an elbow 33 and to be secured to the same by screwing together so as to form a similar fluid tight, self sustaining, and flexible joint 36 permitting of adjustment of its nozzle 40 in a vertical plane. The arm 35 of the elbow 33 remote from the said flexible joint 36 is generally backwardly directed and connected to a delivery pipe 37 which is connected through a downwardly directed elbow 38 and nipple 39 to the middle spray nozzle 40. The said right and left branch pipes 28 connected to the tee and elbow respectively as described are connected to similar spray nozzles 40, by means of an elbow 41, nipple 42, elbow 43, pipe or nipple 44, elbow 45, and nipple 46, flexible, adjustable, and self sustaining joints similar to joint 36 being provided in the branch piping leading to the said branch spray nozzles 40; the first 47, between the downwardly directed elbow 29 or T 27 for the left and right branches respectively, and the nipple 28 permitting of motion in a horizontal plane, the second at 48, between the outwardly and laterally directed elbow 41, and the nipple 42, permitting of motion in a vertical plane, and combined as described comprise an essentially universal connection.

As shown in Figs. 1, 2, 3 and 4 the delivery unit has the middle nozzle 40 essentially at the medial line of the outfit as determined by the location of the reservoir and the spread of the wheels, and the branch pipes leading to the laterally disposed nozzles 40 are essentially equi-distant on each side, and correspond in spread more or less to the spread of the wheels. Furthermore, the shafts are so located preferably that if propelled by a horse one wheel will follow the horse.

The central nozzle 40 will probably in most cases be so located as to travel directly over the top of one row of the growing plants that it is desired to spray and on this account the vertical adjustment by means of the joint 36 may be expected to be most convenient for this particular nozzle, permitting as it does, the elevation of the nozzle according to the height of the plants, although occasionally the joint 47 permitting of adjustment in the horizontal plane, or lateral adjustment, may be found to be of service.

For the lateral nozzles 40 in most cases of a change in adjustment, both joints 47 and 48, making up the universal connection as described between the pipe 25 and the nozzles 40, will be employed, one of the extreme changes being between an adjustment for having the three nozzles 40 spread apart so as to spray three separate rows, as of a small sized growth, each nozzle operating independent of the other, and an adjustment for spraying one row of a relatively larger growth, the central nozzle 40 being raised so as to spray over the tops and the laterally disposed nozzles 40 adjusted essentially as shown in Fig. 2 so as to spray the same row of plants laterally or from the sides.

The number of delivery units such as described may be increased as desired by extending the pipe 25 laterally as indicated in Fig. 6 and taking off the branches from the same. Likewise the number of delivery units H may be increased within the spread used in Figs. 1, 2, 3 and 4, or the spread of the wheels, as for instance by doubling the said units as shown in Fig. 5, retaining the feature of a grouping of three nozzles 40 to a set, and the feature of universal adjustment, including the lateral adjustment of the side branches.

I claim as my invention:—

In a plant spray, a spraying unit comprising a main and a set of three spraying nozzles, including a central nozzle and two lateral nozzles, each connected to the said main by a branch made up of short lengths of pipe connected in series by means of fittings, the joints between said pipes and fittings comprising pipe thread joints, self sustaining and permitting of universal adjustment of the said nozzles, the said central nozzle adapted to be adjusted to spray directly in line with the tops of a row of plants, and the lateral nozzles adapted to be adjusted alternatively to spray the sides of said plants or to spray independently parallel lateral rows of plants.

ALVIN TAPLIN.

Witnesses:
JAMES SHEPARD,
SHEFFIELD H. CLARKE.